United States Patent
Pu

(10) Patent No.: US 12,431,582 B2
(45) Date of Patent: Sep. 30, 2025

(54) BATTERY CELL INCLUDING PRESSURE RELIEF STRUCTURE AND COVER ASEEMBLY HAVING FIRST RECESSED PORTION, MANUFACTURING METHOD AND MANUFACTURING SYSTEM THEREFOR, BATTERY AND ELECTRIC DEVICE

(71) Applicant: CONTEMPORARY AMPEREX TECHNOLOGY (HONG KONG) LIMITED, Hong Kong (CN)

(72) Inventor: Yujie Pu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 448 days.

(21) Appl. No.: 17/896,086

(22) Filed: Aug. 26, 2022

(65) Prior Publication Data
US 2022/0416360 A1    Dec. 29, 2022

Related U.S. Application Data

(63) Continuation of application No. PCT/CN2021/101918, filed on Jun. 23, 2021.

(51) Int. Cl.
*H01M 50/375* (2021.01)
*H01M 10/04* (2006.01)
*H01M 50/103* (2021.01)
*H01M 50/15* (2021.01)
*H01M 50/317* (2021.01)

(52) U.S. Cl.
CPC ..... *H01M 50/375* (2021.01); *H01M 10/0404* (2013.01); *H01M 10/049* (2013.01); *H01M 50/103* (2021.01); *H01M 50/15* (2021.01); *H01M 50/317* (2021.01)

(58) Field of Classification Search
CPC ............. H01M 50/375; H01M 50/103; H01M 50/317; H01M 50/15; H01M 10/0404; H01M 10/049
See application file for complete search history.

(56) References Cited

U.S. PATENT DOCUMENTS

2011/0097613 A1* 4/2011 Kim .................... H01M 50/394
                                                         429/53
2019/0267592 A1   8/2019   Itou et al.

FOREIGN PATENT DOCUMENTS

| CN | 107210403 A | 9/2017 |
|---|---|---|
| CN | 111933833 A | 11/2020 |
| CN | 112713345 A | 4/2021 |
| CN | 213026310 U | 4/2021 |
| EP | 3 486 969 A1 | 5/2019 |
| EP | 3 772 759 A1 | 2/2021 |
| JP | 2001-257004 A | 9/2001 |
| JP | 2014149933 A * | 8/2014 |
| RU | 2675595 C1 | 12/2018 |
| WO | 2016/159099 A1 | 10/2016 |

OTHER PUBLICATIONS

JP 2014149933 English Translation (Year: 2014).*
Office Action issued May 2, 2024 in Russian Patent Application No. 2023133214/07(073379) with English translation.
Extended European Search Report issued Aug. 1, 2023 in European Patent Application No. 21912314.8, 10 pages.
Notice to Grant issued Sep. 24, 2023 in Chinese Patent Application No. 202180006936.3, 8 pages.
Office Action issued Dec. 19, 2023 in Japanese Patent Application No. 2022-566658, 6 pages.

* cited by examiner

*Primary Examiner* — Jimmy Vo
(74) *Attorney, Agent, or Firm* — XSENSUS LLP

(57) ABSTRACT

The application provides a battery cell, a manufacturing method and a manufacturing system therefor, a battery and an electric device. The battery cell in one embodiment of the application includes a casing having an opening and provided with a pressure relief mechanism which is actuated to relieve an internal pressure or temperature of the battery cell when the internal pressure or temperature reaches a threshold value; an electrode assembly accommodated in the casing, and including a body portion and a tab portion protruding therefrom; and a cover assembly for covering the opening. A first recessed portion is formed on one side, abutting against the body portion and facing the electrode assembly, of the cover assembly. The cover assembly is provided with at least one first channel. The first channel can reduce the gas accumulated between the electrode assembly and the cover assembly, thereby reducing the safety risk.

14 Claims, 8 Drawing Sheets

BATTERY CELL INCLUDING PRESSURE RELIEF STRUCTURE AND COVER ASEEMBLY HAVING FIRST RECESSED PORTION, MANUFACTURING METHOD AND MANUFACTURING SYSTEM THEREFOR, BATTERY AND ELECTRIC DEVICE

CROSS REFERENCE TO RELATED APPLICATION

The application claims priority to and the benefit of PCT/CN2021/101918, filed Jun. 23, 2021, the entire content of which is incorporated herein by reference.

TECHNICAL FIELD

The application relates to the technical field of batteries, and in particular to a battery cell, a manufacturing method and a manufacturing system therefor, a battery and an electric device.

BACKGROUND ART

Battery cells are widely used in electronic devices such as mobile phones, laptops, battery cars, electric vehicles, electric aircrafts, electric boats, electric toy cars, electric toy boats, electric toy planes, electric tools, etc. Battery cells can include nickel-cadmium battery cells, nickel-hydrogen battery cells, lithium ion battery cells and secondary alkaline zinc-manganese battery cells.

In the development of battery technology, safety is also an issue that cannot be ignored in addition to improving the performance of battery cells. If the safety of battery cells cannot be guaranteed, the battery cells cannot be used. Therefore, how to improve the safety of battery cells is an urgent technical issue to be solved in battery technology.

SUMMARY OF THE INVENTION

The application provides a battery cell, a manufacturing method and a manufacturing system therefor, a battery and an electric device, which can improve the safety of the battery.

In a first aspect, an embodiment of the application provides a battery cell, which includes:
  a casing having an opening and provided with a pressure relief mechanism which is actuated to relieve an internal pressure or temperature of the battery cell when the internal pressure or temperature reaches a threshold value;
  an electrode assembly accommodated in the casing, and including a body portion and a tab portion protruding therefrom; and
  a cover assembly for covering the opening, with a first recessed portion formed on one side, abutting against the body portion and facing the electrode assembly, of the cover assembly, and configured to accommodate at least part of the tab portion;
  wherein, the cover assembly is provided with at least one first channel for communicating the space between the electrode assembly and the casing with the first recessed portion, so as to introduce the gas in the first recessed portion into the space between the electrode assembly and the casing and enable the same to act on the pressure relief mechanism.

In the above solution, with the first channel arranged on the cover assembly, the gas in the first recessed portion can be introduced into the space between the electrode assembly and the casing in case of thermal runaway of the battery cell, which effectively lowers an increasing rate of air pressure between the electrode assembly and the cover assembly, reduces the gas accumulated between the electrode assembly and the cover assembly, mitigates the risk of explosion of the battery cell at the cover assembly, and improves the safety performance. The first channel can introduce the gas in the first recessed portion into the space between the electrode assembly and the casing, and enable the same to act on the pressure relief mechanism, so that the pressure relief mechanism can be actuated in time to rapidly release the high-temperature and high-pressure substances from the battery cell, thereby reducing the explosion risk.

In some embodiments, the cover assembly includes two first protrusion portions protruding from the bottom wall of the first recessed portion, and the first recessed portion is located between the two first protrusion portions in a first direction. The first protrusion portion is configured to abut against the body portion. In the first direction, the at least one first protrusion portion is provided with at least one of the first channels, and each of the first channels penetrates through the first protrusion portion along the first direction and communicates with the space between the electrode assembly and the casing.

In the above solution, the two first protrusion portions abut against the body portion so that the body portion will not shake as violently as the battery cell vibrates, thus reducing the risk of active substances falling off. The two first protrusion portions may allow the body portion to be uniformly stressed, which reduces stress concentration and improves the stability of the electrode assembly.

In some embodiments, at least one second recessed portion is formed on one side, away from the body portion, of the first protrusion portion, and forms at least part of the first channel. According to an embodiment of the application, the second recessed portion is configured to reduce the weight of the cover assembly and the strength of the first protrusion portion, improve the elasticity of the first protrusion portion, and migrate the risk that the body portion is crushed by the first protrusion portion when the battery cell vibrates.

In some embodiments, the first channel includes a first through hole and/or a first groove.

In some embodiments, the cover assembly further includes a second protrusion portion protruding from the bottom wall of the first recessed portion, and the second protrusion portion abuts against the body portion and is located between the two first protrusion portions. The first recessed portion includes a first part and a second part which are respectively positioned on two sides of the second protrusion portion along the first direction.

In the above solution, the second protrusion portion may abut against the body portion, which may allow the body portion to be uniformly stressed, and thus reduce stress concentration and improve the stability of the electrode assembly. The second protrusion portion may further increase the overall strength of the cover assembly, reduce the risk of deformation and collapse of the cover assembly, and improve the stability. In case of thermal runaway of the electrode assembly, one part of gas is released through an end face, facing the cover assembly, of the body portion; and the second protrusion portion abuts against the end face of the body portion, which can play a blocking role, reduce the rate of gas entering the first recessed portion and migrate the safety risk.

In some embodiments, the second protrusion portion is provided with a second channel for communicating the first part with the second part. In this embodiment, the second channel is configured to allow gas between the first part and the second part to flow, thereby improving the consistency of the air pressure in the first part and the air pressure in the second part.

In some embodiments, the cover assembly further includes two third protrusion portions protruding from the bottom wall of the first recessed portion which is located between the two third protrusion portions in a second direction perpendicular to the first direction. The third protrusion portion is configured to abut against the body portion, and two ends of the third protrusion portion are respectively connected to the two second protrusion portions.

In the above solution, the two third protrusion portions abut against the body portion so that the body portion will not shake as violently as the battery cell vibrates, thus reducing the risk of active substances falling off. The two third protrusion portions may allow the body portion to be uniformly stressed, which reduces stress concentration and improves the stability of the electrode assembly. The third protrusion portion may act as a gas barrier to reduce the gas entering the first recessed portion, which is generated by an outer surface of the body portion after being punctured by particles and short-circuited, and partially released from the punctured position; correspondingly, the risk of explosion of the battery cell at the cover assembly is reduced and the safety performance is improved.

In some embodiments, the electrode assembly includes a positive pole piece, a negative pole piece, and a separator for separating the positive pole piece from the negative pole piece, and is of a winding structure or a laminated structure. The outer surface of the electrode assembly includes two wide surfaces and two narrow surfaces, the area of the wide surfaces is larger than that of the narrow surfaces, the two wide surfaces are arranged opposite to each other along the second direction, and the two narrow surfaces are arranged opposite to each other along the first direction perpendicular to the second direction.

In some embodiments, a first gap exists between the narrow surface and the casing, a second gap exists between the wide surface and the casing, and the size of the first gap is larger than that of the second gap. The pole piece will expand along the thickness direction in the charging and discharging process of the electrode assembly. The largest expansion amount of the winding electrode assembly and the laminated electrode assembly is seen in the direction perpendicular to the wide surface. The wide surface will squeeze the casing as the electrode assembly expands, resulting in a small second gap, and correspondingly a low gas flow rate in the second gap. The first gap has a larger size than the second gap, and the gas flow rate in the first gap is higher than that in the second gap.

In some embodiments, the first channel is configured to communicate the first gap with the first recessed portion. In this embodiment, in case of thermal runaway of the battery cell, the gas in the first recessed portion can be quickly released to the first gap via the first channel, which is large enough to release the gas to the outside of the battery cell timely via the pressure relief mechanism.

In some embodiments, the cover assembly includes an end cover for covering the opening, and an insulating part located on one side, facing the body portion, of the end cover, and the first recessed portion is formed on one side, abutting against the body portion and facing the body portion, of the separator. The insulating part can insulate the end cover from the electrode assembly.

In some embodiments, the battery cell further includes an insulating film for covering the body portion to insulate the body portion from the casing, and an end, facing the end cover, of the insulating film surrounds an outer side of the insulating part and is connected to the insulating part. The insulating film is provided with a second through hole which is arranged opposite to the first channel to communicate with the first channel.

In the above solution, the insulating film may insulate the body portion from the casing, in order that the pole piece in the body portion and the casing will not be turned on even if the separator of the body portion is punctured by particles remaining in the casing; correspondingly, the risk of short circuit is reduced. In this embodiment, the second through hole is arranged to bypass the first channel of the insulating part, thereby reducing the area of the first channel blocked by the insulating film and ensuring the exhaust rate.

In a second aspect, an embodiment of the application provides a battery, including the battery cell according to any one of the embodiments of the first aspect.

In a third aspect, an embodiment of the application provides an electric device, including the battery of the second aspect, the battery is configured to provide electrical energy.

In a fourth aspect, an embodiment of the application provides a method for manufacturing a battery cell, including:

providing a casing which has an opening and is provided with a pressure relief mechanism;
providing an electrode assembly which includes a body portion and a tab portion protruding therefrom;
providing a cover assembly, with a first recessed portion formed on one side of the cover assembly;
connecting the cover assembly to the electrode assembly; and
placing the electrode assembly into the casing, and covering the opening of the cover assembly;
wherein, a first recessed portion is formed on one side, abutting against the body portion and facing the electrode assembly, of the cover assembly, and is configured to accommodate at least part of the tab portion; the cover assembly is provided with at least one first channel for communicating the space between the electrode assembly and the casing with the first recessed portion, so as to introduce the gas in the first recessed portion into the space between the electrode assembly and the casing and enable the same to act on the pressure relief mechanism; and the pressure relief mechanism is actuated to relieve an internal pressure or temperature of the battery cell when the internal pressure or temperature reaches a threshold value.

In a fifth aspect, an embodiment of the application provides a system for manufacturing a battery cell, including:

a first supply device, configured to provide a casing which has an opening and is provided with a pressure relief mechanism;
a second supply device, configured to provide an electrode assembly which includes a body portion and a tab portion protruding therefrom;
a third supply device, configured to supply a cover assembly, with a first recessed portion formed on one side of the cover assembly;
a first assembly device, configured to connect the cover assembly to the electrode assembly; and a second assembly device, configured to place the electrode assembly into the casing and cover the opening of the cover assembly;

wherein, a first recessed portion is formed on one side, abutting against the body portion and facing the electrode assembly, of the cover assembly, and is configured to accommodate at least part of the tab portion; the cover assembly is provided with at least one first channel for communicating the space between the electrode assembly and the casing with the first recessed portion, so as to introduce the gas in the first recessed portion into the space between the electrode assembly and the casing and enable the same to act on the pressure relief mechanism; and the pressure relief mechanism is actuated to relieve an internal pressure or temperature of the battery cell when the internal pressure or temperature reaches a threshold value.

BRIEF DESCRIPTION OF THE DRAWINGS

In order to describe the technical solutions in the embodiments of the application more clearly, the accompanying drawings required for describing the embodiments are briefly described below. Obviously, the accompanying drawings in the following description show merely some embodiments of the present disclosure, and a person of ordinary skill in the art would also be able to derive other accompanying drawings from these accompanying drawings without creative efforts.

Figure 1:
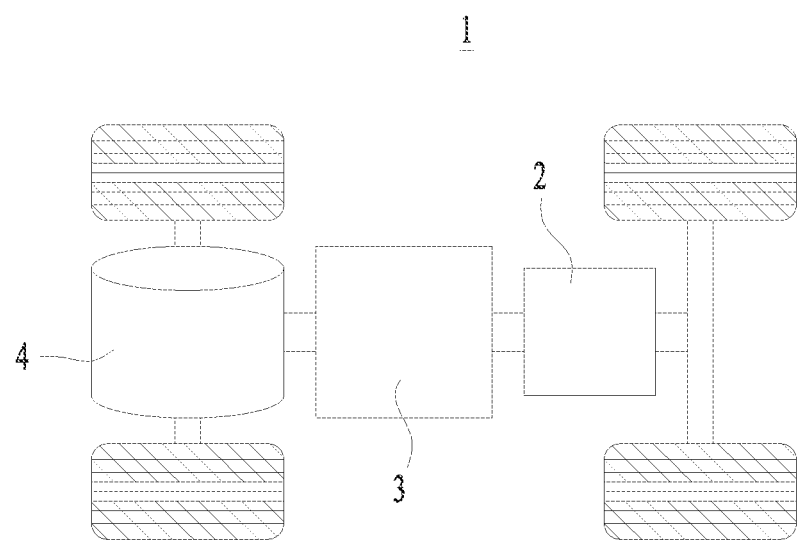
FIG. 1 is a structural schematic diagram of a vehicle provided in some embodiments of the application.

In the drawings, the components are not drawn to actual scale.

SPECIFIC EMBODIMENTS

To make the objectives, technical solutions, and advantages of the embodiments of the application clearer, the following will clearly describe the technical solutions in the embodiments of the application with reference to the accompanying drawings in the embodiments of the application. Apparently, the described embodiments are some rather than all of the embodiments of the application. Based on the embodiments of the application, all other embodiments obtained by those of ordinary skill in the art without making creative efforts fall within the scope of protection of the application.

Unless otherwise defined, all technical and scientific terms used in the application have the same meanings as those commonly understood by those who belong to the technical field of the present application. In the application, the terms used in the specification of the application are merely for the purpose of describing specific embodiments, and are not intended to limit the application. The terms "including" and "having" and any variations thereof in the specification and claims of the application and the above accompanying drawings are intended to cover non-exclusive inclusion. The terms "first", "second", etc. in the specification and claims of the application or the above accompanying drawings are used to distinguish different objects, but not to describe a specific order or primary and secondary relationship.

Reference to an "embodiment" in the application means that a specific feature, structure or characteristic described in conjunction with an embodiment may be included in at least one embodiment of the application. The appearance of this phrase in various places in the specification does not necessarily mean the same embodiment, nor is it an independent or alternative embodiment mutually exclusive with other embodiments.

In the description of the application, it should be noted that, unless otherwise explicitly specified and defined, the terms "mounting", "connecting", "connection" and "attachment" should be understood in a broad sense, for example, they may be a fixed connection, a detachable connection, or an integrated connection; and may be a direct connection, or an indirect connection via an intermediate medium, or communication inside two elements. For those of ordinary skill in the art, the specific meanings of the above terms in the application could be understood according to specific circumstances.

As used herein, the term "and/or" is merely used to describe an associated relationship between associated objects and means three relationships, for example, A and/or B may mean A alone, A and B together, and B alone. In addition, the character "/" in the application generally indicates that the associated objects are an "or" relationship.

In the embodiments of the application, the same reference numerals refer to same components, and for the sake of brevity, detailed descriptions of the same components are omitted in different embodiments. It should be understood that a thickness, a length, a width and other dimensions of various components and an overall thickness, length, width and other dimensions of an integrated device shown in the accompanying drawings in the embodiments of the application are merely exemplary, and should not constitute any limitation on the application.

The term "plurality" in the application means two or more.

In the application, battery cells may include a lithium ion secondary battery cell, a lithium ion primary battery cell, a lithium-sulfur battery, a sodium lithium-ion battery cell, a sodium ion battery cell, a magnesium ion battery cell, etc., which are not limited by the embodiments of the application. The battery cell may be in cylindrical, flat, cuboid or other shapes, which is not limited by the embodiments of the application. Generally, the battery cells are divided into three types according to packaging manners: cylindrical battery cells, square battery cells and pouch battery cells, which are not limited by the embodiments of the application.

The battery mentioned in the embodiments of the application refers to a single physical module which includes one or a plurality of battery cells and therefore provides a higher voltage and capacity. For example, the battery mentioned in the application may include a battery module or a battery pack, etc. Generally, the battery includes a box for packaging one or a plurality of battery cells. The box may prevent liquid or other foreign matter from affecting charging or discharging of the battery cell.

The battery cell includes an electrode assembly and an electrolyte, and the electrode assembly includes a positive pole piece, a negative pole piece and a separator. The battery cell works mainly depending on movement of metal ions between the positive pole piece and the negative pole piece. The positive pole piece includes a positive current collector and a positive active material layer coated on a surface of the positive current collector; the positive current collector includes a positive current collecting portion and a positive protrusion portion protruding from the positive current collecting portion, the positive current collecting portion is coated with the positive active material layer, at least part of the positive protrusion portion is not coated with the positive active material layer, and the positive protrusion portion serves as a positive tab. Taking a lithium ion battery as an example, the positive current collector may be made of aluminum, and the positive active material layer includes a positive active material which may be lithium cobaltate, lithium iron phosphate, ternary lithium or lithium manganate. The negative pole piece includes a negative current collector and a negative active material layer coated on a surface of the negative current collector; the negative current collector includes a negative current collecting portion and a negative protrusion portion protruding from the negative current collecting portion, the negative current collecting portion is coated with the negative active material layer, at least part of the negative protrusion portion is not coated with the negative active material layer, and the negative protrusion portion serves as a negative tab. The negative current collector may be made of copper, and the negative active material layer includes a negative active material which may be carbon or silicon. In order to guarantee fusing does not occur during large current flow, a plurality of positive tabs are stacked together, and a plurality of negative tabs are stacked together. The separator may be made of polypropylene (PP) or polyethylene(PE). In addition, the electrode assembly may be in a winding structure or a laminated structure, which is not limited in the embodiments of the application.

The battery cell further includes a casing having an opening, and a cover assembly for covering the opening to form a sealed connection, so as to form an accommodating cavity for accommodating the electrode assembly and an electrolyte.

For a battery cell, the main safety hazard comes from charging and discharging processes, suitable ambient temperature design is also needed, and there are generally at least three protective measures for the battery cell for effectively avoiding unnecessary losses. Specifically, the protective measures at least include switching elements, appropriate materials of the separator and the pressure relief mechanisms. The switch element is an element capable of stopping charging or discharging the battery when a temperature or resistance in the battery cell reaches a certain threshold value. The separator is configured to separate the positive pole piece from the negative pole piece, and may automatically dissolve the micro-scale (even nano-scale) micropores attached to the separator when the temperature rises to a certain value, thereby preventing metal ions from passing through the separator and terminating the internal reaction of the battery cell.

The pressure relief mechanism refers to an element or component that is actuated to relieve internal pressure or temperature of the battery cell when the internal pressure or temperature reaches a preset threshold value. The threshold value is designed differently according to different design requirements. The threshold value may depend on one or more materials of the positive pole piece, the negative pole piece, the electrolyte and the separator in the battery cell. The pressure relief mechanism may be an explosion-proof valve, an air valve, a pressure relief valve or a safety valve, and specifically structured as pressure-sensitive elements, that is, when the internal pressure or temperature of the battery cell reaches a predetermined threshold value, the pressure relief mechanism will act or the weak structure provided in the pressure relief mechanism will break, thus forming an opening or channel for releasing the internal pressure or temperature.

The "actuation" mentioned in the application means that the pressure relief mechanism acts or is activated to a certain state, so that the internal pressure or temperature of the battery cell can be released. The action produced by the pressure relief mechanism may include, but is not limited to, at least a portion of the pressure relief mechanism breaking, crushing, being torn, or opened, etc. When the pressure relief mechanism is actuated, a high-temperature and high-pressure substance in the battery cell may be discharged outwards from an actuated portion as emissions. In this way, the pressure of the battery cell can be relieved under the condition of controllable pressure, thereby avoiding a potentially more serious accident.

Emissions from battery cells mentioned in the application include, but are not limited to, electrolyte, positive and negative pole pieces dissolved or split, fragments of separators, high-temperature and high-pressure gas and flame produced by reaction, and so on.

The pressure relief mechanism on the battery cell has an important influence on the safety of the battery cell. For example, the phenomena including short circuit and overcharge may lead to thermal runaway and sudden pressure rise inside the battery cell. In this case, the internal pressure may be released outward through the actuation of the pressure relief mechanism to prevent the battery cell from exploding and catching fire.

The pressure relief mechanism may be arranged on the cover assembly or the casing. The inventors found that, with the pressure relief mechanism arranged on the casing, in case of thermal runaway of the battery cell, the gas released from the battery cell is easy to accumulate between the cover assembly and the electrode assembly; blocked by the cover assembly, the gas cannot be released from the pressure relief mechanism in time, causing potential safety hazards.

In view of this, an embodiment of the application provides a technical solution, in which the battery cell includes a casing having an opening and provided with a pressure relief mechanism which is actuated to relieve an internal pressure or temperature of the batter cell when the internal pressure or temperature reaches a threshold value; an electrode assembly accommodated in the casing, and including a body portion and a tab portion protruding therefrom; and a cover assembly for covering the opening, with a first recessed portion formed on one side, abutting against the body portion and facing the electrode assembly, of the cover assembly, and configured to accommodate at least part of the tab portion. wherein, the cover assembly is provided with at least one first channel for communicating the space between the electrode assembly and the casing with the first recessed portion, so as to introduce the gas in the first recessed portion into the space between the electrode assembly and the casing and enable the same to act on the pressure relief mechanism. With the structure, the battery cell can lead out the gas between the cover assembly and the electrode assembly and release the same through the pressure relief mechanism in case of thermal runaway, thus improving the exhaust rate and safety performance.

The technical solution described in the embodiment of the application is applicable to batteries and electric devices using the batteries.

The electric devices may be vehicles, mobile phones, portable devices, laptops, ships, spacecraft, electric toys and electric tools. The vehicles may be fuel vehicles, gas vehicles or new energy vehicles, and the new energy vehicles may be battery electric vehicles, hybrid electric vehicles, extended-range vehicles, etc. The spacecrafts include airplanes, rockets, space shuttles, spaceships, etc. The electric toys include fixed or mobile electric toys, such as game machines, electric car toys, electric ship toys and electric airplane toys. The electric tools include metal cutting electric tools, electric grinding tools, electric assembling tools and electric tools for railways, such as electric drills, electric grinders, electric wrenches, electric screwdrivers, electric hammers, impact electric drills, concrete vibrators, electric planers, etc. The embodiment of the application does not impose special restrictions on the above-mentioned electric devices.

For the sake of illustration, the following embodiments are illustrated with a vehicle as an electric device.

FIG. 1 is a schematic structural diagram of a vehicle provided in some embodiments of the application. As shown in FIG. 1, a battery 2 is disposed inside a vehicle 1, and the battery 2 may be disposed at the bottom, head or tail of the vehicle 1. The battery 2 may be used for supplying electricity to the vehicle 1, for example, the battery 2 may be used as an operating power source for the vehicle 1.

The vehicle 1 may further include a controller 3 and a motor 4, where the controller 3 is used for controlling the battery 2 to supply electricity to the motor 4 to be used for, for example, operating electricity requirements during start-up, navigation and running of the vehicle 1.

In some embodiments of the application, the battery 2 may not only serve as the operating power source for the vehicle 1, but also serve as a driving power source for the vehicle 1, so as to replace or partially replace fuel or natural gas to provide driving power for the vehicle 1.

Figure 2:
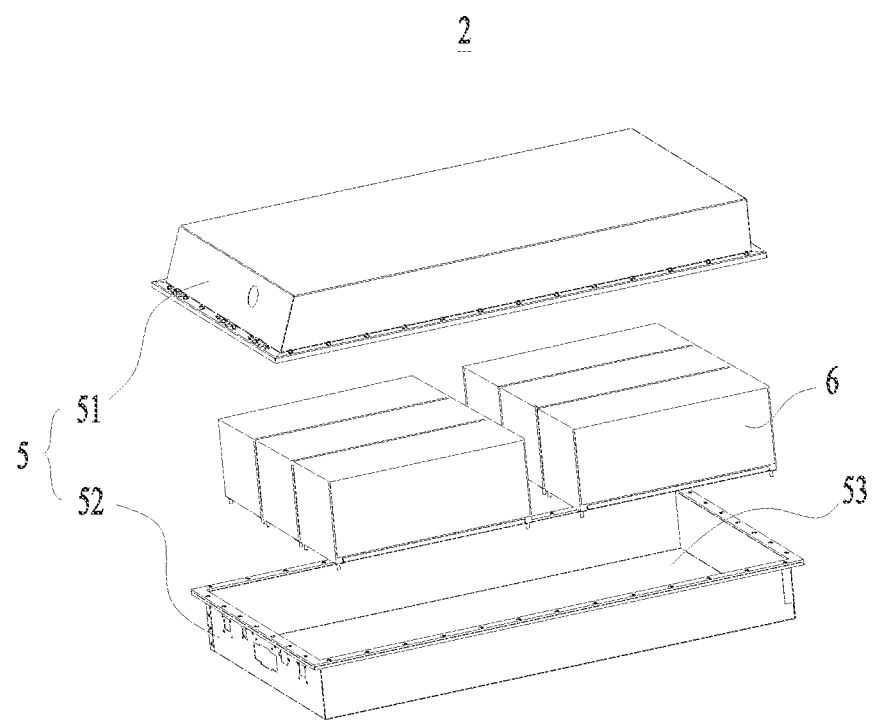
FIG. 2 is an exploded view of a battery provided in some embodiments of the application.

FIG. 2 is an exploded view of a battery provided in some embodiments of the application. As shown in FIG. 2, the battery 2 includes a box 5 and a battery cell (not shown in FIG. 2), and the battery cell is accommodated in the box 5.

The box 5 is used for accommodating the battery cell and may be of various structures. In some embodiments, the box 5 may include a first box portion 51 and a second box portion 52, the first box portion 51 and the second box portion 52 may cover each other, and the first box portion 51 and the second box portion 52 define an accommodation space 53 for accommodating the battery cell together. The second box portion 52 may be of a hollow structure with an opening end, the first box portion 51 is of a plate-like structure, and the first box portion 51 covers an opening side of the second box portion 52 so as to form the box 5 with the accommodation space 53. The first box portion 51 and the second box portion 52 may be both of hollow structures with opening sides, and an opening side of the first box portion 51 covers the opening side of the second box portion 52 so as to form the box 5 with the accommodation space 53. Of course, the first box portion 51 and the second box portion 52 may be in various shapes, such as a cylinder or a cuboid.

In order to improve sealability after the first box portion 51 and the second box portion 52 are connected, a sealing member, such as a sealant or a sealing ring, may be arranged between the first box portion 51 and the second box portion 52.

Assuming that the first box portion 51 covers a top portion of the second box portion 52, the first box portion 51 may also be referred to as an upper box cover, and the second box portion 52 may also be referred to as a lower box.

There may be one or more battery cells in the battery 2. If there are a plurality of battery cells, the plurality of battery cells may be connected in series, in parallel, or in a series-parallel manner. The plurality of battery cells may be directly connected in series, in parallel, or in a series-parallel manner, and then a whole formed by the plurality of battery cells is accommodated in the box 5. Of course, the plurality of battery cells may be connected in series, in parallel, or in a series-parallel manner first to form a battery module 6, and then a plurality of battery modules 6 are connected in series, in parallel, or in a series-parallel manner to form a whole to be accommodated in the box 5.

Figure 3:
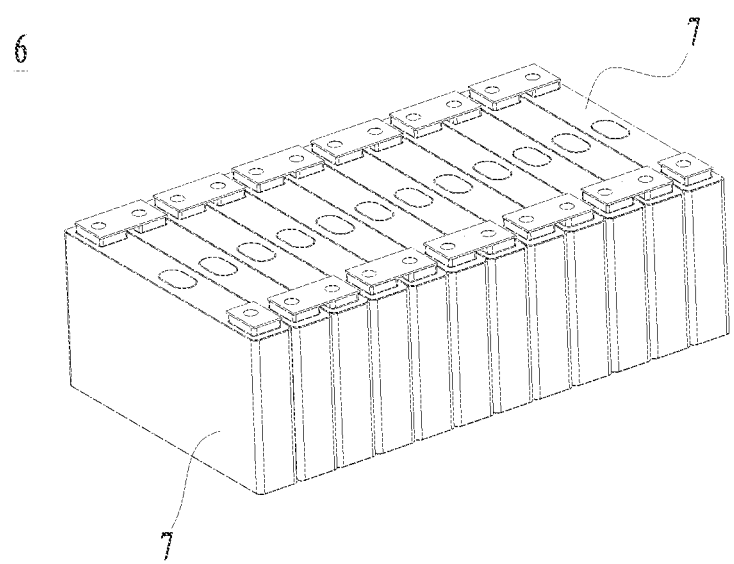
FIG. 3 is a structural schematic diagram of a battery module shown in FIG. 2.

FIG. 3 is a schematic structural diagram of the battery module shown in FIG. 2. As shown in FIG. 3, in some embodiments, a plurality of battery cells 7 are provided, and the plurality of battery cells 7 are connected in series, in parallel or in parallel-series to form battery modules 6, then the plurality of battery modules 6 are connected in series, in parallel or in parallel-series to form a single unit, and are accommodated in the box.

The plurality of battery cells 7 in the battery module 6 may be electrically connected to each other by means of bus components, so as to be connected in series, in parallel, or in a series-parallel manner.

Figure 4:
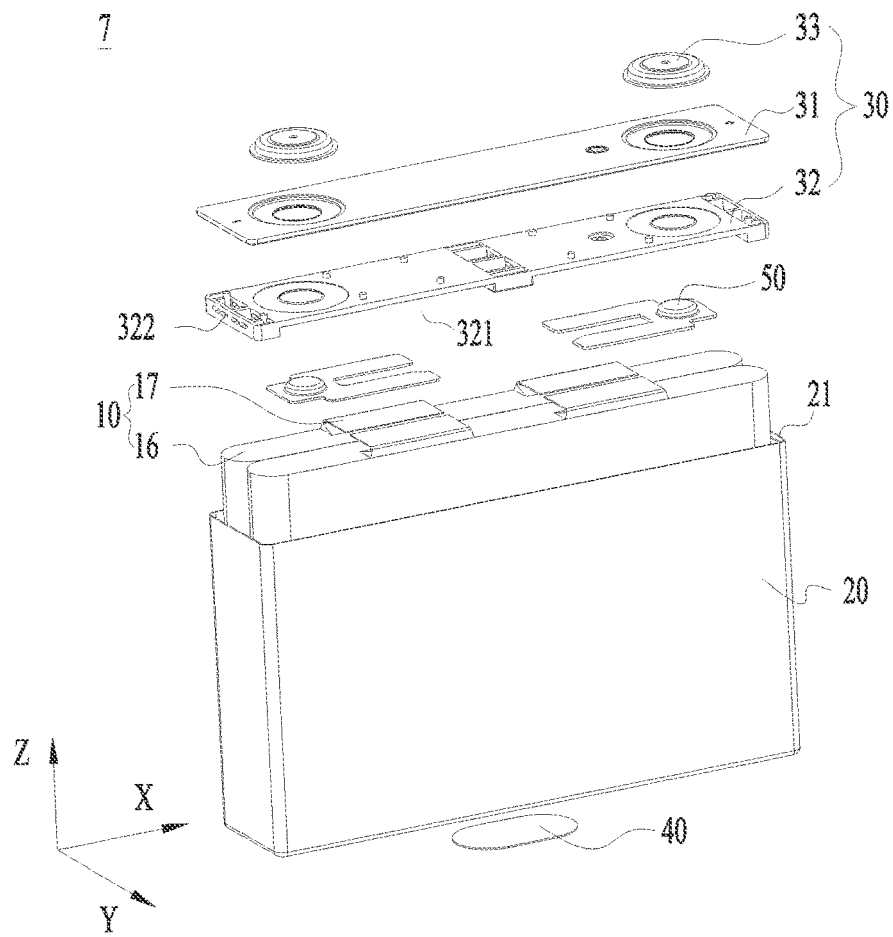
FIG. 4 is an exploded view of a battery cell provided in some embodiments of the application.

FIG. 4 is an exploded view of a battery cell provided in some embodiments of the application.

As shown in FIG. 4, the battery cell 7 provided in one embodiment of the application includes an electrode assembly 10, a casing 20 and a cover assembly 30.

The casing 20 is a hollow structure with one side open, and the cover assembly 30 covers the opening of the casing 20 to form a sealed connection, so as to form an accommodating cavity for accommodating the electrode assembly 10 and electrolyte.

The housing 20 may take a variety of shapes, such as cylinder and cuboid. The shape of the housing 20 may be determined according to the specific shape of the electrode assembly 10. For example, if the electrode assembly 10 is of a cylindrical structure, a cylindrical casing may be selected and used. If the electrode assembly 10 is of a cuboid structure, a cuboid casing may be selected and used.

In some embodiments, the cover assembly 30 includes an end cover 31 for covering the opening of the casing 20. The end cover 31 may be of various structures, for example, a plate-like structure, a hollow structure with one end open, or the like. Exemplarily, in FIG. 4, the housing 20 is a cuboid structure, and the end cover 31 is a plate-like structure and covers an opening at the top of the housing 20.

The end cover 31 may be made of an insulating material (e.g. plastic) or a conductive material (e.g. metal). In case that the end cover 31 is made of conductive material, the cover assembly 30 may further include an insulating part 32 located on one side, facing the electrode assembly 10, of the end cover 31 to insulate the end cover 31 from the electrode assembly 10.

In some embodiments, the cover assembly 30 may further include an electrode terminal 33 mounted on the end cover 31. Two electrode terminals 33 are provided and defined as a positive electrode terminal and a negative electrode terminal respectively which are electrically connected to the electrode assembly 10 to output the electric energy generated by the electrode assembly 10.

In other embodiments, the battery cell 7 includes a casing 20 having a hollow structure with opposite sides open, and two cover assemblies 30 for covering two openings of the casing 20 correspondingly to form a sealed connection, so as to form an accommodating cavity for accommodating the electrode assembly 10 and an electrolyte. With the structure, one cover assembly 30 may be provided with two electrode terminals 33 while the other cover assembly 30 is not provided with an electrode terminal 33; alternatively, both cover assemblies 30 may be provided with one electrode terminal 33 respectively.

In the battery cell 7, there may be one or more electrode assemblies 10 accommodated in the housing 20. Illustratively, in FIG. 4, there are two electrode assemblies 10.

Figure 5:
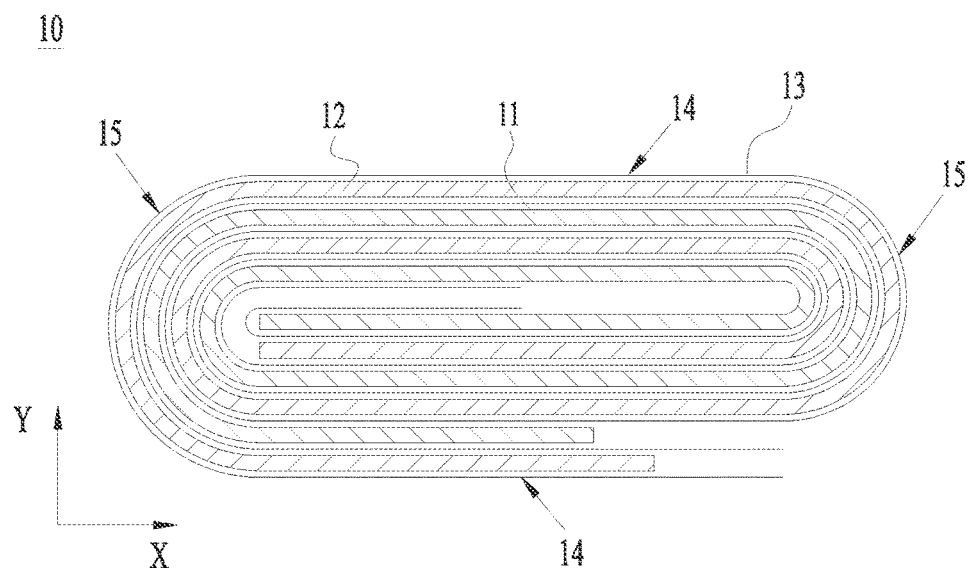
FIG. 5 is a structural representation of an electrode assembly of a battery cell provided in some embodiments of the application.
Figure 6:
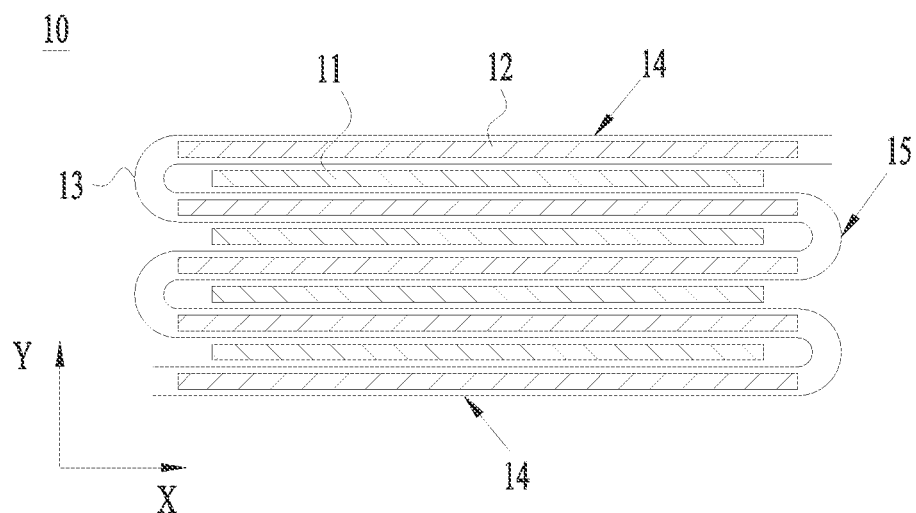
FIG. 6 is a structural representation of an electrode assembly of a battery cell provided in some other embodiments of the application.

FIG. 5 is a structural representation of an electrode assembly of a battery cell provided according to some embodiments of the application; and FIG. 6 is a structural representation of an electrode assembly of a battery cell provided according to other embodiments of the application.

As shown in FIG. 5 and FIG. 6, the electrode assembly 10 includes a positive pole piece 11, a negative pole piece 12, and a separator 13 for separating the positive pole piece 11 from the negative pole piece 12, and the electrode assembly 10 is of a winding structure or a laminated structure.

As shown in FIG. 5, in some embodiments, the electrode assembly 10 is of a winding structure. The positive pole piece 11, the negative pole piece 12 and the separator 13 are strip structures. In this embodiment of the application, the positive pole piece 11, the separator 13 and the negative pole piece 12 may be sequentially laminated and wound for more than two turns to form an flat electrode assembly 10. The electrode assembly 10 may be directly wound into a flat form, or firstly wound into a hollow cylindrical structure and then flattened.

FIG. 5 illustrates the outline of the winding electrode assembly 10. The outer surface of the electrode assembly 10 includes two wide surfaces 14 with the flat surfaces arranged opposite to each other, and two narrow surfaces 15 arranged opposite to each other and connected to the two wide surfaces 14 substantially parallel to the winding axis of the electrode assembly 10 as a surface with the largest area. The wide surface 14 may be a relatively flat surface, and is not required to be purely flat. The narrow surface 15 is at least partially a circular arc surface. The area of the wide surface 14 is larger than that of the narrow surface 15.

In an alternative embodiment, as shown in FIG. 6, the electrode assembly 10 is a laminated structure. Specifically, the electrode assembly 10 includes a plurality of positive pole pieces 11 and a plurality of negative pole pieces 12, which are alternately stacked. In the laminated structure, both the positive pole piece 11 and the negative pole piece 12 are in from of sheets, with the lamination direction generally parallel to the thickness direction of the positive pole piece 11 and the negative pole piece 12.

FIG. 6 illustrates the outline of the laminated electrode assembly 10. The outer surface of the electrode assembly 10 includes two wide surfaces 14 arranged opposite to each other, and two narrow surfaces 15 arranged opposite to each other and connected to the two wide surfaces 14 as a surface with the largest area. The wide surface 14 may be a relatively flat surface, and is not required to be purely flat. The narrow surface 15 is at least partially a circular arc surface. The area of the wide surface 14 is larger than that of the narrow surface 15.

Figure 7:
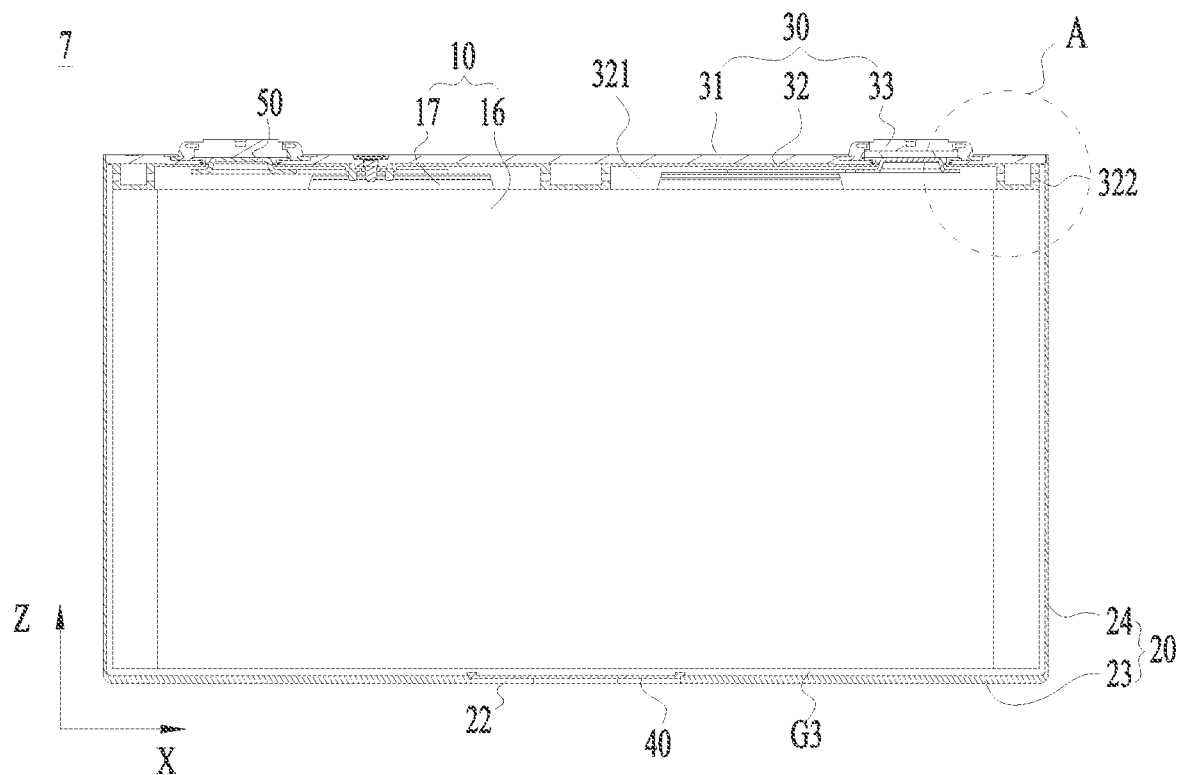
FIG. 7 is a sectional view of a battery cell provided in some embodiments of the application.
Figure 8:
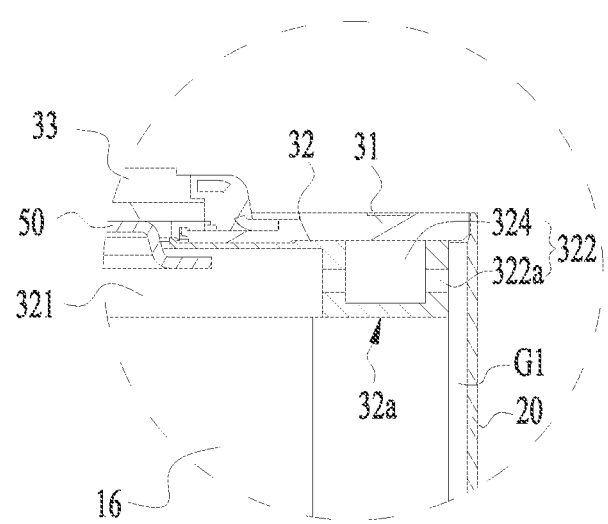
FIG. 8 is an enlarged view of the battery cell shown in FIG. 7 at the round frame A.

FIG. 7 is a sectional view of a battery cell provided in some embodiments of the application; FIG. 8 is an enlarged view of the battery cell shown in FIG. 7 at the round frame A; and FIG. 9 is a structural representation of an insulating part of a cover assembly of a battery cell provided in some embodiments of the application.

Figure 9:
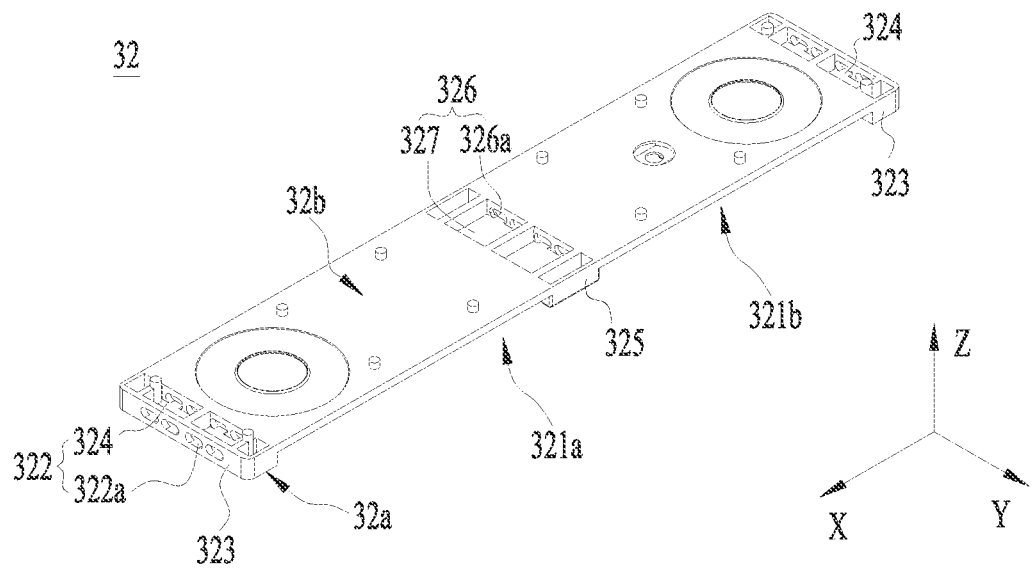
FIG. 9 is a structural representation of an insulating part of a cover assembly of a battery cell provided by some embodiments of the application.

As shown in FIG. 7 to FIG. 9, the battery cell 7 in one embodiment of the application includes a casing 20 having an opening 21 and provided with a pressure relief mechanism 40 which is actuated to relieve an internal pressure or temperature of the battery cell 7 when the internal pressure or temperature reaches a threshold value; an electrode assembly 10 accommodated in the casing 20, and including a body portion 16 and a tab portion 17 protruding therefrom; and a cover assembly 30 for covering the opening 21; and a first recessed portion 321 is formed on one side, abutting against the body portion 16 and facing the electrode assembly 10, of the cover assembly 30, and is configured to accommodate at least part of the tab portion 17; wherein the cover assembly 30 is provided with at least one first channel 322 for communicating the space between the electrode assembly 10 and the casing 20 with the first recessed portion 321, so as to introduce the gas in the first recessed portion 321 into the space between the electrode assembly 10 and the casing 20 and enable the same to act on the pressure relief mechanism 40.

In terms of the shape, the electrode assembly 10 includes a body portion 16 and a tab portion 17 connected thereto. Exemplarily, the tab portion 17 extends from an end, near the cover assembly 30, of the body portion 16.

In some embodiments, two tab portions 17 are provided and defined as a positive tab portion and a negative tab portion respectively. The positive tab portion and the negative tab portion may extend from the same end of the body portion 16, or may extend from opposite ends of the body portion 16 respectively.

As a core part of the electrode assembly 10, the body portion 16 is designed to realize the charging and discharging function, and generates current led out by the tab portion 17. The body portion 16 includes a positive current collecting portion of a positive current collector, a positive active material layer, a negative current collecting portion of a negative current collector, a negative active material layer and a separator 13. The positive tab portion includes a plurality of positive tabs, and the negative tab portion includes a plurality of negative tabs.

By design, the tab portion 17 is electrically connected to the electrode terminals 33, for example, by means of a welding method, or an indirect method featuring combination of other members. For instance, the battery cell 7 further includes a current collecting member 50 for electrically connecting the electrode terminal 33 and the tab portion 17. Two current collecting members 50 are provided and respectively defined as a positive current collecting member for electrically connecting the positive electrode terminal and the positive tab portion, and a negative current collecting member for electrically connecting the negative electrode terminal and the negative tab portion.

The pressure relief mechanism 40 may be disposed in the casing 20 as a part or a separate structure of the casing 20. The casing 20 is provided with a through pressure relief hole 22 which is sealed by the pressure relief mechanism 40 fixed to the casing 20 by means of a welding method, so as to separate the space between the inside and outside of the casing 20 and prevent electrolyte from flowing out through the pressure relief hole 22 during normal operation.

The casing 20 may include a bottom plate 23 located at one side, away from the cover assembly 30, of the body portion 16, and a side plate 24 for connecting the bottom plate 23 and the end cover 31. The pressure relief mechanism 40 may be arranged on the bottom plate 23 or the side plate 24.

By design, the pressure relief mechanism 40 is actuated to relieve an internal pressure or temperature of the battery cell 7 when the internal pressure or temperature reaches a threshold value. In case the gas generated by the battery cell 7 is excessive to increase the internal pressure or temperature inside the casing 20 to a threshold value, the pressure relief mechanism 40 will execute an action or the weak structure provided in the pressure relief mechanism 40 will be broken, enabling the gas and other high-temperature and high-pressure substances to be released outward through a cracked opening of the pressure relief mechanism 40 and the pressure relief hole 22, and thus preventing an explosion of the battery cell 7.

The pressure relief mechanism 40 may be of various possible pressure relief structures, which is not limited herein. For example, the pressure relief mechanism 40 may be a pressure-sensitive pressure relief mechanism or a temperature-sensitive pressure relief mechanism. The pressure-sensitive pressure relief mechanism is configured to break when the internal air pressure of the battery cell 7 provided with the pressure-sensitive pressure relief mechanism reaches a threshold value; while the temperature-sensitive pressure relief mechanism is configured to break when the internal temperature of the battery cell 7 provided with the temperature-sensitive pressure relief mechanism reaches a threshold value.

In some embodiments, nicks, grooves or other structures are made on the pressure relief mechanism 40 to reduce local strength and form a weak structure which will be broken as the internal pressure of the battery cell 7 reaches a threshold value, and along the broken part the pressure relief mechanism 40 is folded to form an opening for releasing the high-temperature and high-pressure substances.

The cover assembly 30 may directly abut against the end face, facing the cover assembly 30, of the body portion 16, or may indirectly abut against the body portion 16 by means of other members. The cover assembly 30 presses against one side of the body portion 16 so that the body portion 16 will not shake in the casing 20 as violently as the battery cell 7 vibrates, thus reducing the risk of active substances falling off the electrode assembly 10.

The first recessed portion 321 may be made on one side, facing the electrode assembly 10, of the end cover 31 in case the end cover 31 of the cover assembly 30 is made of an insulating material, or made on one side, facing the electrode assembly 10, of the insulating part 32 in case the end cover 31 of the cover assembly 30 is made of a conductive material and the cover assembly 30 includes a separator 32.

The first recessed portion 321 is configured to accommodate at least part of the tab portion 17; namely, the tab portion 17 may be accommodated in the first recessed portion 321 in part or in whole. By providing the first recessed portion 321, more space may be vacated for the electrode assembly 10, which improves the energy density of the battery cell 7. At least part of the current collecting member 50 may also be accommodated in the first recessed portion 321.

According to an embodiment of the application, the first channel 322 of the cover assembly 30 may be made by removing part of the material of the cover assembly 30. The shape of the first channel 322 is not limited in the application, for example, the first channel 322 can be formed by opening grooves and/or holes on the cover assembly 30. The first channel 322 of the cover assembly 30 is a space not filled with solids, through which fluids (e.g. gas and liquid) can flow.

The first channel 322 communicates the space between the electrode assembly 10 and the casing 20 with the first recessed portion 321, and the fluid in the first recessed portion 321 can flow into the space between the electrode assembly 10 and the casing 20 via the first channel 322.

The space between the electrode assembly 10 and the casing 20 may be in direct communication with the first channel 322, or may be in indirect communication therewith via holes, gaps or other spatial structures.

In case of short circuit or overcharge, the electrode assembly 10 is under thermal runaway and releases high-temperature and high-pressure substances such as high-temperature and high-pressure gas, which partially enters the first recessed portion 321, or is introduced into the space between the electrode assembly 10 and the casing 20 by the first channel 322. With the gradual increase of gas in the space between the electrode assembly 10 and the casing 20, the pressure of the pressure relief mechanism 40 increases and finally reaches a threshold value. Afterwards, the pressure relief mechanism 40 is actuated to release gas and other high-temperature and high-pressure substances to the outside of the battery cell 7, thereby releasing the internal pressure of the battery cell 7 and preventing explosion and fire of the battery cell 7.

Exemplarily, with the pressure relief mechanism 40 actuated to open the pressure relief hole 22, the space between the electrode assembly 10 and the casing 20 communicates with the pressure relief hole 22. The gas in the first recessed portion 321 is released through the first channel 322, the space between the electrode assembly 10 and the casing 20, and the pressure relief hole 22.

According to an embodiment of the application, the shape and position of the first channel 322 are not limited, as long as the space between the electrode assembly 10 and the casing 20 is in communication with the first recessed portion 321 via the first channel 322. The first channel 322 may be a hole, a groove, a combination of holes and grooves, or other communication structures.

The first channel 322 may be made on the end cover 31 in case the end cover 31 of the cover assembly 30 is made of an insulating material; and the first recessed portion 321 may be made on the insulating part 32 when the end cover 31 of the cover assembly 30 is made of a conductive material and the cover assembly 30 includes the insulating part 32.

According to an embodiment of the application, with the first channel 322 arranged on the cover assembly 30, the gas in the first recessed portion 321 can be introduced into the space between the electrode assembly 10 and the casing 20 in case of thermal runaway of the battery cell 7, which effectively lowers an increasing rate of air pressure between the electrode assembly 10 and the cover assembly 30, reduces the gas accumulated between the electrode assembly 10 and the cover assembly 30, mitigates the risk of explosion of the battery cell 7 at the cover assembly 30, and improves the safety performance. The first channel 322 can introduce the gas in the first recessed portion 321 into the space between the electrode assembly 10 and the casing 20, and enable the same to act on the pressure relief mechanism 40, so that the pressure relief mechanism 40 can be actuated in time to rapidly release the high-temperature and high-pressure substances from the battery cell 7, thereby reducing the explosion risk.

In some embodiments, the cover assembly 30 includes two first protrusion portions 323 protruding from the bottom wall of the first recessed portion 321 which is located between the two first protrusion portions 323 in the first direction X. The first protrusion portion 323 is configured to abut against the body portion 16. In the first direction X, at least one first protrusion portion 323 is provided with at least one first channel 322 which passes through the first protrusion portion 323 along the first direction X and is in communication with the space between the electrode assembly 10 and the casing 20.

The cover assembly 30 has a first inner surface 32a for abutting against the body portion 16; and the first recessed portion 321 is recessed in a direction away from the body portion 16 with respect to the first inner surface 32a. The first inner surface 32a includes a surface, abutting against the body portion 16, of the first protrusion portion 323. Optionally, the first inner surface 32a is a plane.

It should be noted that the at least one first protrusion portion 323 is provided with the at least one first channel 322 in the following ways: one first protrusion portion 323 is provided with one first channel 322 and the other first protrusion portion 323 is not provided with the first channel 322; alternatively, one first protrusion portion 323 is provided with one first channel 322 and the other first protrusion portion 323 is provided with one first channel 322; alternatively, one first protrusion portion 323 is provided with one first channel 322 and the other first protrusion portion 323 is provided with a plurality of first channels 322; alternatively, one first protrusion portion 323 is provided with a plurality of first channels 322 and the other first protrusion portion 323 is not provided with the first channel 322; alternatively, the two first protrusion portions 323 are both provided with a plurality of first channels 322.

The first protrusion portion 323 has two first side surfaces arranged opposite to each other along the first direction X, and having openings at both ends of the first channel 322 respectively. The openings at both ends of the first channel 322 may be aligned to the first direction X, or arranged in a staggered manner.

According to an embodiment of the application, the two first protrusion portions 323 abut against the body portion 16 so that the body portion 16 will not shake as violently as the battery cell 7 vibrates, thus reducing the risk of active substances falling off. The two first protrusion portions 323 may allow the body portion 16 to be uniformly stressed, which reduces stress concentration and improves the stability of the electrode assembly 10.

In some embodiments, the first protrusion portion 323 and the casing 20 are arranged at an interval in the first direction X, so that the casing 20 does not block the first channel 322 and the gas in the first recessed portion 321 can be smoothly released through the first channel 322.

Taking the cover assembly 30 (including the insulating part 32) as an example, the first inner surface 32a is the surface, facing the body portion 16, of the separator 32. The insulating part 32 includes a first recessed portion 321 and two first protrusion portions 323. Exemplarily, the two first protrusion portions 323 are respectively located at both ends of the insulating part 32 along the first direction X.

In some embodiments, at least one second recessed portion 324 is formed on one side, facing away from the body portion 16, of the first protrusion portion 323, and forms at least part of the first channel 322.

According to an embodiment of the application, the second recessed portion 324 is configured to reduce the weight of the cover assembly 30 and the strength of the first protrusion portion 323, improve the elasticity of the first protrusion portion 323, and migrate the risk that the body portion 16 is crushed by the first protrusion portion 323 when the battery cell 7 vibrates.

Taking the cover assembly 30 (including the insulating part 32) as an example, the insulating part 32 includes a first inner surface 32a and a first outer surface 32b which are arranged opposite to each other, and the first outer surface 32b faces the end cover 31. The second recessed portion 324 is recessed in a direction close to and away from the end cover 31 with respect to the first outer surface 32b. The end cover 31 is attached to the first outer surface 32b and covers the second recessed portion 324.

In some embodiments, the first channel 322 includes a first through hole 322a and/or a first groove.

The first groove is recessed in a direction away from the body portion 16 with respect to the first inner surface 32a. Two ends of the first groove extend to two first sides of the first protrusion portion 323 respectively along the first direction X.

The first through hole 322a penetrates through the first protrusion portion 323 along the first direction X, that is, both ends of the first through hole 322a extend to two first side surfaces of the first protrusion portion 323 respectively along the first direction X.

The first channel 322 may include only the first through hole 322a, only the first groove, or both the first through hole 322a and the first groove. Certainly, the first channel 322 may further include other communication structures, for example, the first channel 322 may further include a second recessed portion 324.

In some embodiments, the first channel 322 includes the first through hole 322a and the second recessed portion 324 in communication with the first through hole 322a.

In some embodiments, the cover assembly 30 further includes a second protrusion portion 325 protruding from the bottom wall of the first recessed portion 321, and the second protrusion portion 325 abuts against the body portion 16 and is located between the two first protrusion portions 323. The first recessed portion 321 includes a first part 321a and a second part 321b, which are located on both sides of the second protrusion portion 325 along the first direction X, respectively.

The number of the second protrusion portion 325 may be one or more. If a plurality of second protrusion portions 325 are provided, the plurality of second protrusion portions 325 may be arranged at an interval along the first direction X. The second protrusion portion 325 divides the first recessed portion 321 into a plurality of parts.

The first part 321a and the second part 321b may be communicated by other structures, or blocked from each other.

The second protrusion portion 325 may abut against the body portion 16, so that the body portion 16 is uniformly stressed to reduce stress concentration and improve the stability of the electrode assembly 10. The second protrusion portion 325 may also increase the overall strength of the cover assembly 30, reduce the risk of deformation and collapse of the cover assembly 30, and improve the stability.

In case of thermal runaway of the electrode assembly 10, a part of gas is released via the end face, facing the cover assembly 30, of the body portion 16; and the second protrusion portion 325 abuts against the end face of the body portion 16 to play a blocking role, which further decreases the rate of gas entering the first recessed portion 321, and reduces the safety risk.

In some embodiments, the second protrusion portion 325 is provided with a second channel 326 for communicating the first part 321a with the second part 321b.

In the application, with the second channel 326 arranged, the gas can flow between the first part 321a and the second part 321b, thereby improving the consistency of the air pressure in the first part 321a and the air pressure in the second part 321b.

In some embodiments, the second channel 326 includes a third through hole 326a which penetrates through the second protrusion portion 325 along the first direction X, and/or a second groove (not shown) which is recessed in a direction away from the body portion 16 with respect to the surface, abutting against the body portion 16, of the second protrusion portion 325; and the second groove penetrates through the second protrusion portion 325 in the first direction X.

In some embodiments, the second protrusion portion 325 is formed on the insulating part 32 which is further provided with a third recessed portion 327 located on one side, away from the body portion 16, of the second protrusion portion 325. The third recessed portion 327 is recessed in a direction close to the body portion 16 with respect to the first outer surface 32b, and forms at least part of the second channel 326.

Figure 10:
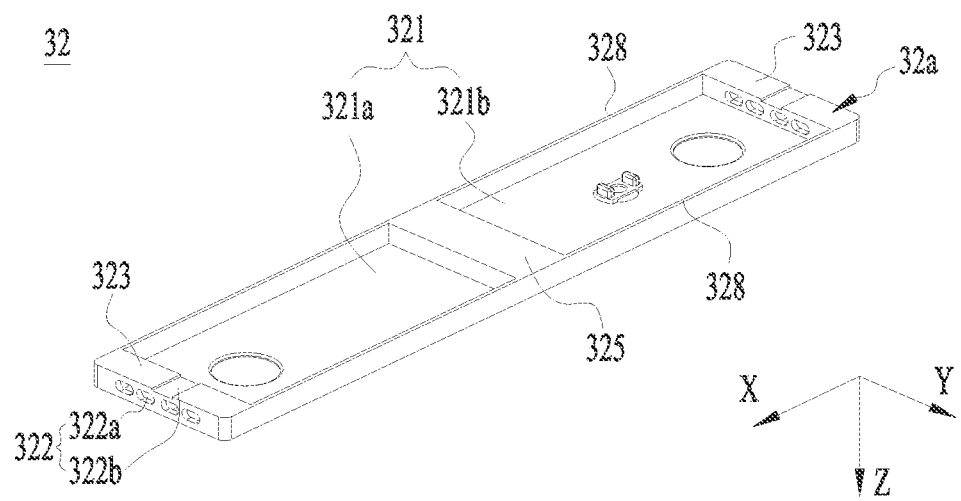
FIG. 10 is a structural representation of an insulating part of a cover assembly of a battery cell provided in some other embodiments of the application.

FIG. 10 is a structural representation of an insulating part of a cover assembly provided in other embodiments of the application.

As shown in FIG. 10, in some embodiments, the cover assembly further includes two third protrusion portions 328 protruding from the bottom wall of the first recessed portion 321 which is located between the two third protrusion portions 328 in the second direction Y perpendicular to the first direction X. The third protrusion portion 328 is configured to abut against the body portion, and both ends of the third protrusion portion 328 are connected to the two second protrusion portions 325 respectively.

According to an embodiment of the application, the third protrusion portions 328 abut against the body portion so that the body portion will not shake as violently as the battery cell vibrates, thus reducing the risk of active substances falling off. The two third protrusion portions 328 may allow the body portion to be uniformly stressed, which reduces stress concentration and improves the stability of the electrode assembly.

The third protrusion portion 328 may act as a gas barrier to reduce the gas entering the first recessed portion 321, which is generated by an outer surface of the body portion after being punctured by particles and short-circuited, and partially released from the punctured position; correspondingly, the risk of explosion of the battery cell at the cover assembly is reduced and the safety performance is improved.

Exemplarily, the two third protrusion portions 328 are located at both ends of the insulating part 32 along the second direction Y respectively.

In some embodiments, the first channel 322 includes a first through hole 322a and a first groove 322b.

Figure 11:
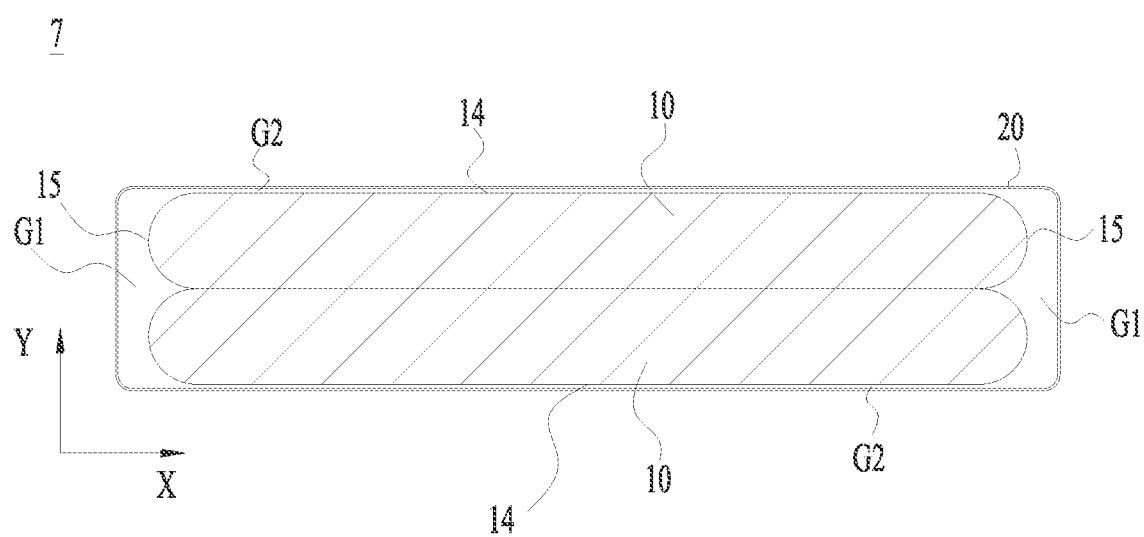
FIG. 11 is another sectional view of a battery cell provided in some embodiments of the application.

FIG. 11 is another sectional view of a battery cell provided in some embodiments of the application.

As shown in FIG. 11, in some embodiments, the electrode assembly 10 includes a positive pole piece, a negative pole piece, and a separator for separating the positive pole piece from the negative pole piece, and is of a winding structure or a laminated structure.

The outer surface of the electrode assembly 10 includes two wide surfaces 14 and two narrow surfaces 15, the area of the wide surfaces 14 is larger than that of the narrow surfaces 15, the two wide surfaces 14 are arranged opposite to each other along the second direction Y, and the two narrow surfaces 15 are arranged opposite to each other along the first direction X perpendicular to the second direction Y.

In some embodiments, a first gap G1 exists between the narrow surface 15 and the casing 20, a second gap G2 exists between the wide surface 14 and the casing 20, and the size of the first gap G1 is larger than that of the second gap G2.

The pole piece 10 will expand along the thickness direction in the charging and discharging process of the electrode assembly. The largest expansion amount of the winding electrode assembly 10 and the laminated electrode assembly 10 is seen in the direction perpendicular to the wide surface 14. The wide surface 14 will squeeze the casing 20 as the electrode assembly 10 expands, resulting in a small second gap G2, and correspondingly a low gas flow rate in the second gap G2. The first gap G1 has a larger size than the second gap G2, and the gas flow rate in the first gap G1 is higher than that in the second gap.

In some embodiments, the first channel is configured to communicate the first gap G1 with the first recessed portion. In this way, in case of thermal runaway of the battery cell 7, the gas in the first recessed portion can be quickly released to the first gap G1 via the first channel, which is large enough to release the gas to the outside of the battery cell 7 timely via the pressure relief mechanism.

In some embodiments, referring to FIG. 7 and FIG. 11, the casing 20 includes a bottom plate 23, which, together with the cover assembly 30, is respectively located on both sides of the electrode assembly 10 along the third direction Z. In the third direction Z, a third gap G3 exists between the bottom plate 23 and the electrode assembly 10, and is in communication with the second gap G2 and the first gap G1 respectively.

Figure 12:
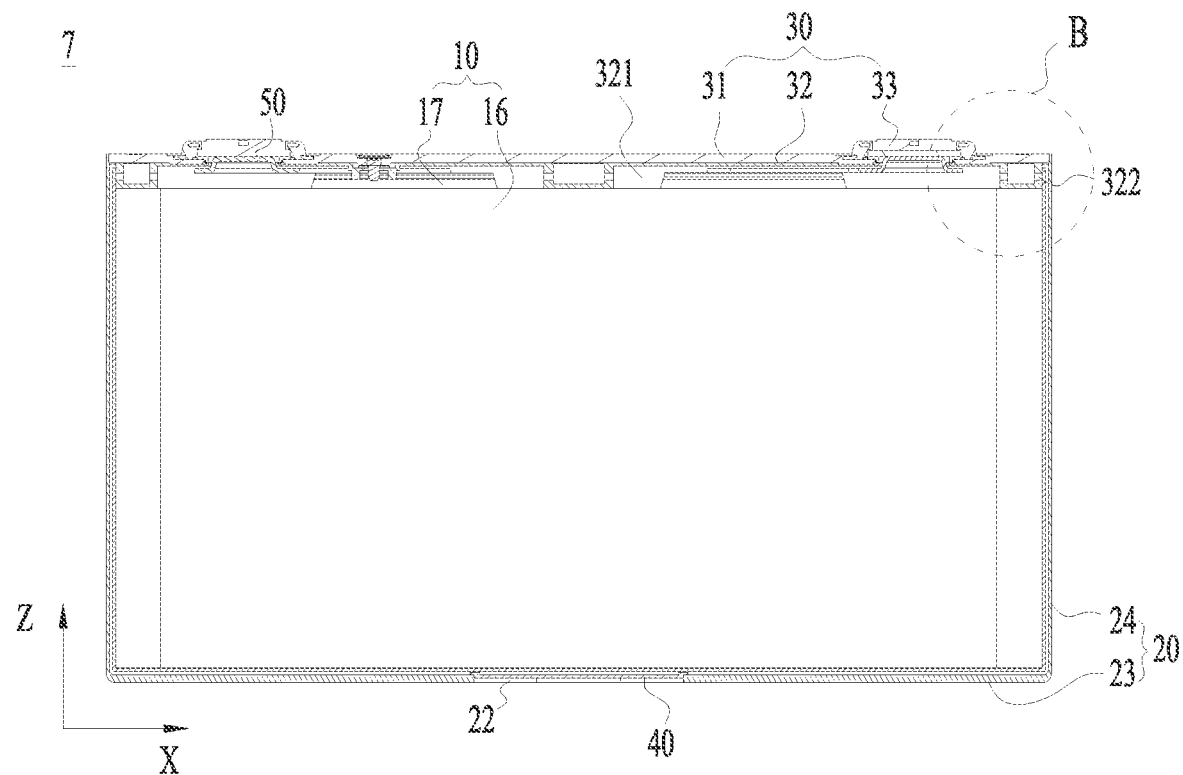
FIG. 12 is a sectional view of battery cells provided in some other embodiments of the application.
Figure 13:
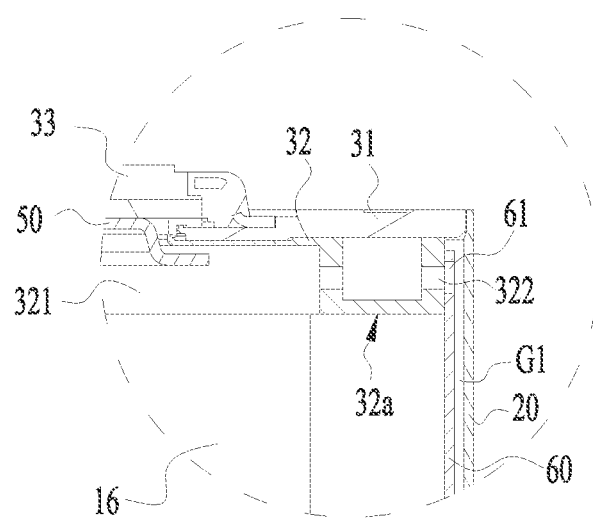
FIG. 13 is an enlarged view of the battery cell shown in FIG. 12 at the round frame B.

FIG. 12 is a sectional view of a battery cell provided in other embodiments of the application; and FIG. 13 is an enlarged view of a battery cell shown in FIG. 12 at the round frame B.

As shown in FIG. 12 and FIG. 13, the cover assembly 30 includes an end cover 31 for covering the opening, and an insulating part 32 located on one side, facing the body portion 16, of the end cover 31, and the first recessed portion 321 is formed on one side, abutting against the body portion 16 and facing the body portion 16, of the insulating part 32.

In some embodiments, the battery cell 7 further includes an insulating film 60 for covering the body portion 16 to insulate the body portion 16 from the casing 20, and an end, facing the end cover 31, of the insulating film 60 surrounds an outer side of the insulating part 32 and is connected to the insulating part 32. The insulating film 60 is provided with a second through hole 61, which is arranged opposite to the first channel 322 to communicate with the first channel 322.

The assembly of the battery cell 7 may produce particles (e.g., metal particles generated in the welding process), which will remain in the casing 20. If adhering to the surface of the body portion 16, particles may puncture the separator of the body portion 16 so that the casing 20 and the body portion 16 are electrically connected; alternatively, particles may also fall into the body portion 16 and allow the positive and negative pole pieces to be electrically connected, resulting in short circuit and safety risk.

In the application, the insulating film 60 may be configured to insulate the body portion 16 from the casing 20, in order that the pole piece in the body portion 16 and the casing 20 will not be electrically connected even if the separator of the body portion 16 is punctured by particles remaining in the casing 20; correspondingly, the risk of short circuit is reduced.

The second through hole 61 is configured to communicate the space (e.g. the first gap G1) between the casing 20 and the electrode assembly 10 with the first channel 322. According to an embodiment of the application, the second through hole 61 is arranged to bypass the first channel 322 of the insulating part 32, thereby reducing the area of the first channel 322 blocked by the insulating film 60 and ensuring the exhaust rate.

The insulating film 60 is provided with a plurality of pore structures (not shown) which can communicate spaces on both sides of the insulating film 60, so that gas can flow smoothly on both sides of the insulating film 60.

The insulating film 60 may be connected to the insulating part 32 by means of adhesion, welding and other methods, so as to fix the insulating film 60. The insulating film 60 may be partially connected to the insulating part 32 (e.g., several points of the insulating film 60 are welded to the insulating part 32), leaving gaps between other areas of the insulating film 60 and the insulating part 32.

For example, a gap is left between the insulating film 60 and the first protrusion portion 323, through which the gas in the first channel 322 can be discharged. At this time, the second through hole 61 may be omitted.

Figure 14:
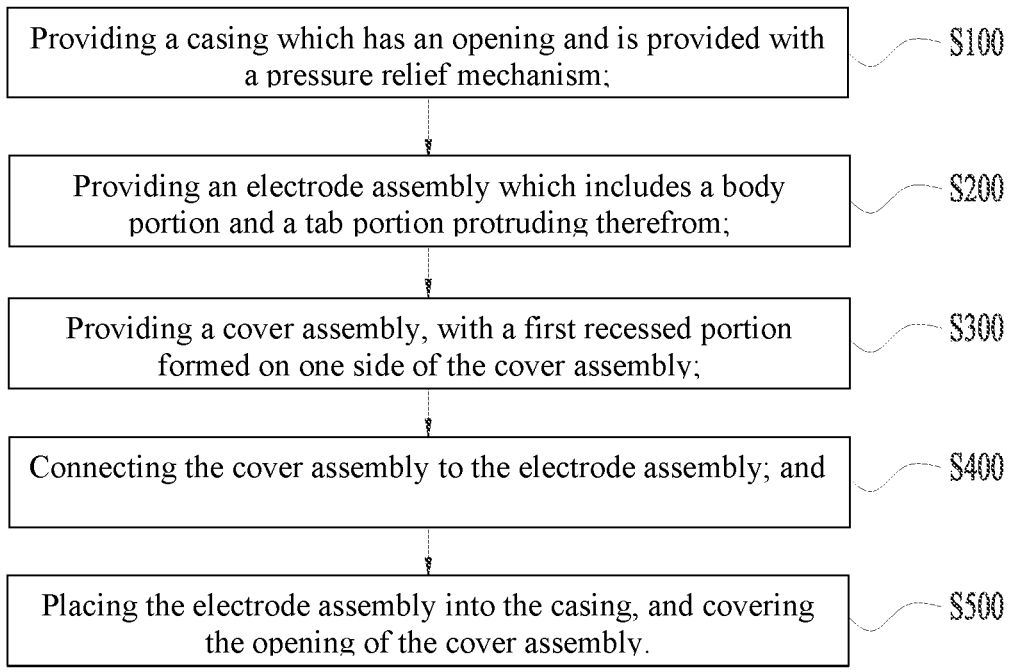
FIG. 14 is a schematic flow chart of a method for manufacturing a battery cell provided in some embodiments of the application.

FIG. 14 is a schematic flow chart of the manufacturing method provided in some embodiments of the application.

As shown in FIG. 14, the method for manufacturing the battery cell in the embodiments of the application includes:

S100. providing a casing, the casing having an opening and provided with a pressure relief mechanism;

S200. providing an electrode assembly, the electrode assembly comprising a body portion and a tab portion protruding therefrom;

S5300. providing a cover assembly, a first recessed portion being formed on one side of the cover assembly;

S400. connecting the cover assembly to the electrode assembly; and

S500. placing the electrode assembly into the casing, and covering the opening of the cover assembly.

A first recessed portion is formed on one side, abutting against the body portion and facing the electrode assembly, of the cover assembly, and is configured to accommodate at least part of the tab portion; the cover assembly is provided with at least one first channel for communicating the space between the electrode assembly and the casing with the first recessed portion, so as to introduce the gas in the first recessed portion into the space between the electrode assembly and the casing and enable the same to act on the pressure relief mechanism; and the pressure relief mechanism is actuated to relieve an internal pressure or temperature of the battery cell when the internal pressure or temperature reaches a threshold value.

It should be noted that for relevant structures of battery cells manufactured by the method for manufacturing the battery cell, refer to the battery cell provided in the above embodiments.

When assembling battery cells based on the method for manufacturing the battery cell, it is not necessary to follow the above steps sequentially, that is, the steps can be performed in the sequence mentioned in the embodiments, or in a sequence different from that mentioned in the embodiments, or several steps can be performed simultaneously. For example, steps S100, S200, and S300 may be performed in no particular order, or at the same time.

Figure 15:
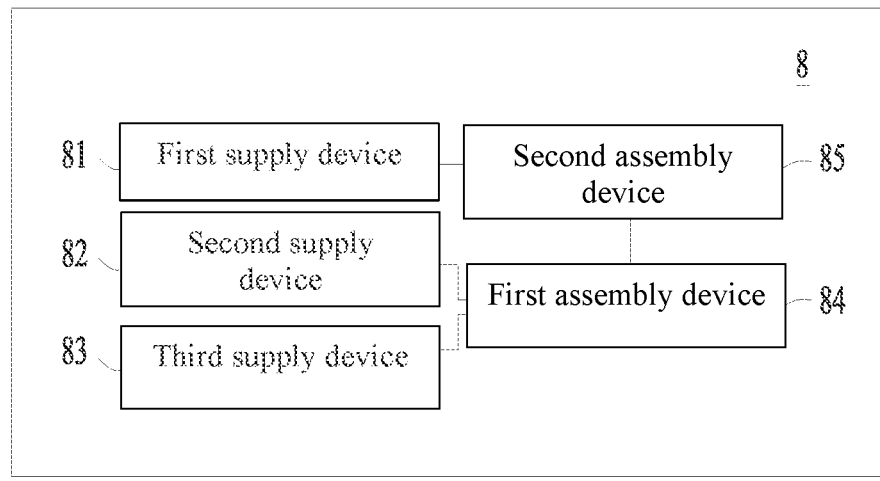
FIG. 15 is a schematic block diagram of a system for manufacturing a battery cell provided in some embodiments of the application.

FIG. 15 is a schematic block diagram of a system for manufacturing a battery cell provided in some embodiments of the application.

As shown in FIG. 15, the manufacturing system 8 of the battery cell in one embodiment of the application includes a first supply device 81 configured to supply a casing which has an opening and is provided with a pressure relief mechanism; a second supply device 82 configured to supply an electrode assembly which includes a body portion and a tab portion protruding therefrom; a third supply device 83 configured to supply a cover assembly, with a first recessed portion formed on one side of the cover assembly; a first assembly device 84 configured to connect the cover assembly to the electrode assembly; and a second assembly device 85 configured to place the electrode assembly into the casing and cover the opening of the cover assembly. wherein, a first recessed portion is formed on one side, abutting against the body portion and facing the electrode assembly, of the cover assembly, and is configured to accommodate at least part of the tab portion; the cover assembly is provided with at least one first channel for communicating the space between the electrode assembly and the casing with the first recessed portion, so as to introduce the gas in the first recessed portion into the space between the electrode assembly and the casing and enable the same to act on the pressure relief mechanism; and the pressure relief mechanism is actuated to relieve an internal pressure or temperature of the battery cell when the internal pressure or temperature reaches a threshold value.

For relevant structures of battery cells manufactured by the manufacturing system, refer to the battery cell provided in the above embodiments.

It should be noted that the embodiments in the application and features in the embodiments may be combined with one another if there is no conflict.

Finally, it should be noted that the above embodiments are merely used to describe the technical solution of the application, rather than limiting the same. Although the application has been described in detail with reference to the foregoing embodiments, those skilled in the art should understand that the technical solution described in the foregoing embodiments may still be modified, or some of the technical features therein may be equivalently replaced. However, these modifications or substitutions do not make the essence of the corresponding technical solutions deviate from the spirit and scope of the technical solutions of each embodiment of the application.

What is claimed is:

1. A battery cell, comprising:
   a casing having an opening and provided with a pressure relief structure on a bottom plate or a side plate of the casing, the pressure relief structure being actuated to relieve an internal pressure or temperature of the battery cell when the internal pressure or temperature reaches a threshold value;
an electrode assembly accommodated in the casing, and comprising a body portion and a tab portion protruding therefrom; and
a cover assembly for covering the opening, a first recessed portion being formed on one side, abutting against the body portion and facing the electrode assembly, of the cover assembly, and being configured to accommodate at least part of the tab portion;
wherein the cover assembly is provided with at least one first channel for communicating the space between the electrode assembly and the casing with the first recessed portion, so as to introduce the gas in the first recessed portion into the space between the electrode assembly and the casing and enable the same to act on the pressure relief structure;
the cover assembly comprises two first protrusion portions protruding from the bottom wall of the first recessed portion, and the first recessed portion is located between the two first protrusion portions in a first direction;
the first protrusion portion is configured to abut against the body portion; and
in the first direction, at least one of the first protrusion portions is provided with one of the at least one first channel, and the one of the at least one first channel penetrates through the first protrusion portion along the first direction and communicates with the space between the electrode assembly and the casing.

2. The battery cell according to claim 1, wherein at least one second recessed portion is formed on one side, away from the body portion, of the first protrusion portion, and forms at least part of the first channel.

3. The battery cell according to claim 2, wherein the first channel comprises a first through hole and/or a first groove.

4. The battery cell according to claim 3, wherein the cover assembly further comprises a second protrusion portion protruding from the bottom wall of the first recessed portion, and the second protrusion portion abuts against the body portion and is located between the two first protrusion portions; and
the first recessed portion comprises a first part and a second part which are respectively positioned on two sides of the second protrusion portion along the first direction.

5. The battery cell according to claim 4, wherein the second protrusion portion is provided with a second channel for communicating the first part with the second part.

6. The battery cell according to claim 5, wherein the cover assembly further comprises two third protrusion portions protruding from the bottom wall of the first recessed portion, and the first recessed portion is located between the two third protrusion portions in a second direction perpendicular to the first direction; and
the third protrusion portion is configured to abut against the body portion, and two ends of the third protrusion portion are respectively connected to the two second protrusion portions.

7. The battery cell according to claim 6,
wherein the electrode assembly comprises a positive pole piece, a negative pole piece and a separator for separating the positive pole piece from the negative pole piece, and the electrode assembly is of a winding structure or a laminated structure; and
an outer surface of the electrode assembly comprises two wide surfaces and two narrow surfaces, the area of the wide surfaces is larger than that of the narrow surfaces, the two wide surfaces are arranged opposite to each other along the second direction, and the two narrow surfaces are arranged opposite to each other along the first direction perpendicular to the second direction.

8. The battery cell according to claim 7, wherein a first gap exists between the narrow surface and the casing, a second gap exists between the wide surface and the casing, and the size of the first gap is larger than that of the second gap.

9. The battery cell according to claim 8, wherein the first channel is configured to communicate the first gap with the first recessed portion.

10. The battery cell according to claim 9, wherein the cover assembly comprises an end cover for covering the opening, and an insulating part located on one side, facing the body portion, of the end cover, and the first recessed portion is formed on one side, abutting against the body portion and facing the body portion, of the separator.

11. The battery cell according to claim 10, further comprising an insulating film for covering the body portion to insulate the body portion from the casing, an end, facing the end cover, of the insulating film surrounding an outer side of the insulating part and being connected to the separator; and
the insulating film being provided with a second through hole which is arranged opposite to the first channel to communicate with the first channel.

12. A battery, comprising the battery cell according to claim 11.

13. An electric device, comprising the battery according to claim 12, the battery being configured to provide electrical energy.

14. A method for manufacturing a battery cell, comprising:
providing a casing, the casing having an opening and provided with a pressure relief structure on a bottom plate or a side plate of the casing, the pressure relief structure being actuated to relieve an internal pressure or temperature of the battery cell when the internal pressure or temperature reaches a threshold value;
providing an electrode assembly accommodated in the casing, and the electrode assembly comprising a body portion and a tab portion protruding therefrom;
providing a cover assembly for covering the opening, a first recessed portion being formed on one side, abutting against the body portion and facing the electrode assembly, of the cover assembly, and being configured to accommodate at least part of the tab portion;
connecting the cover assembly to the electrode assembly; and
placing the electrode assembly into the casing, and covering the opening of the cover assembly;
wherein the cover assembly is provided with at least one first channel for communicating the space between the electrode assembly and the casing with the first recessed portion, so as to introduce the gas in the first recessed portion into the space between the electrode assembly and the casing and enable the same to act on the pressure relief structure;
the cover assembly comprises two first protrusion portions protruding from the bottom wall of the first recessed portion, and the first recessed portion is located between the two first protrusion portions in a first direction;

the first protrusion portion is configured to abut against the body portion; and in the first direction, at least one of the first protrusion portions is provided with one of the at least one first channel, and the one of the at least one first channel penetrates through the first protrusion portion along the first direction and communicates with the space between the electrode assembly and the casing.

* * * * *